Sept. 4, 1934.  E. E. HEWITT  1,972,737
CHECK VALVE DEVICE
Filed Sept. 14, 1932
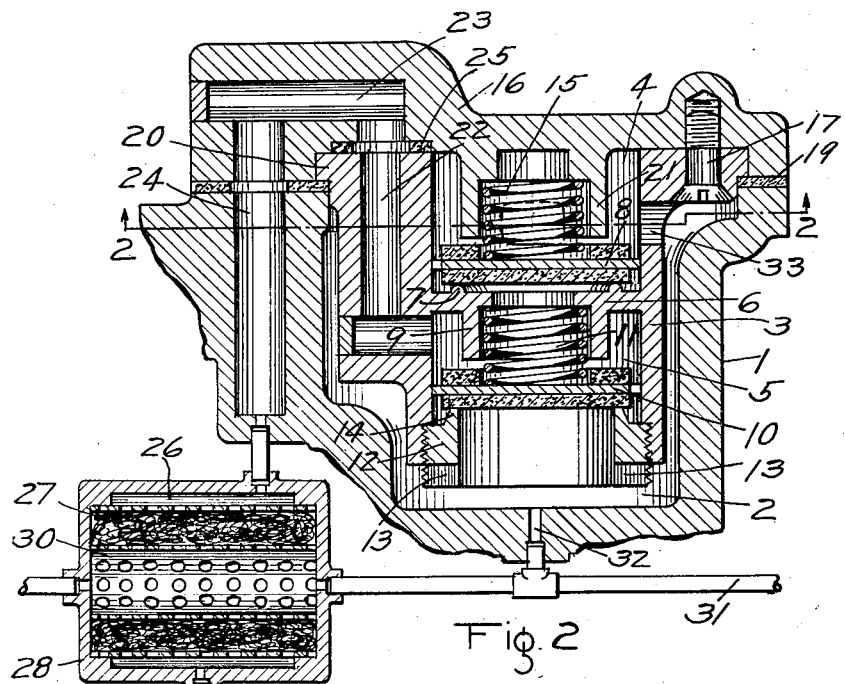
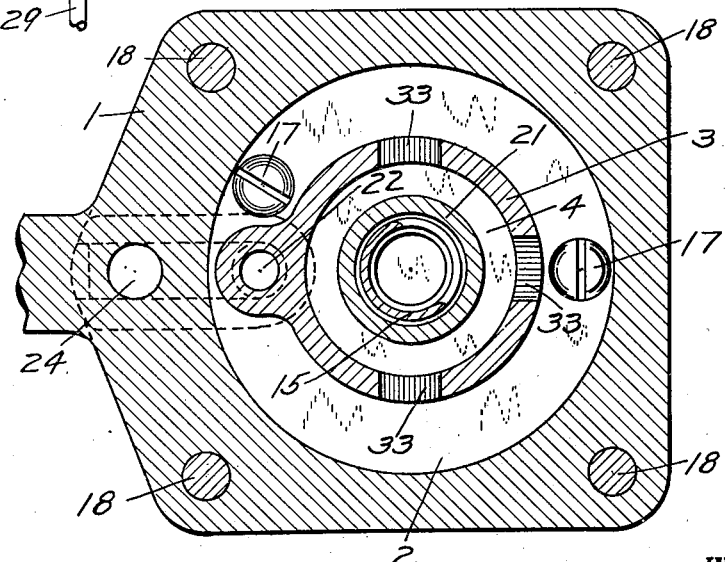
INVENTOR
ELLIS E. HEWITT
BY Wm. M. Cady
ATTORNEY Patented Sept. 4, 1934

1,972,737

UNITED STATES PATENT OFFICE 1,972,737

CHECK VALVE DEVICE

Ellis E. Hewitt, Edgewood, Pa., assignor to The Westinghouse Air Brake Company, Wilmerding, Pa., a corporation of Pennsylvania Application September 14, 1932, Serial No. 633,145

1 Claim. (Cl. 277—61)

This invention relates to fluid pressure devices, and more particularly to check valve devices adapted for use with fluid pressure brake equipments.

The principal object of my invention is to provide an improved multiple check valve construction in which the check valve structure may be removed and assembled as a unit, in case replacement or repairs are necessary.

Other objects and advantages will appear in the following more detailed description of the invention.

In the accompanying drawing; Fig. 1 is a sectional view of a multiple check valve construction embodying my invention; and Fig. 2 a section on the line 2—2 of Fig. 1.

To illustrate an application of my improved check valve construction, I have shown in the drawing multiple check valves employed as by-pass valves to permit flow of fluid under pressure in case the normal flow through a strainer should fail, by reason of the clogging of the strainer with foreign matter.

In the drawing, the numeral 1 indicates a portion of a brake controlling valve casing which is provided with a chamber 2. Extending into said chamber is a multiple check valve construction comprising a cage 3 having chambers 4 and 5 which are defined by a partition wall 6. At one side, the partition 6 is provided with a seat rib 7, on which a check valve 8, mounted in chamber 4, is adapted to seat. At the opposite side, the partition wall is provided with a depending hollow cylindrical portion 9, which acts as a stop to limit the movement of a check valve 10, which is mounted in the chamber 5.

A coil spring 11 is interposed between the partition wall 6 and the check valve 10, and after the spring and the check valve 10 have been assembled in the chamber 5, a screw plug 12 is screwed into the open end of the chamber 5, the plug being provided with a screw driver slot 13 for that purpose.

The plug 12 is also provided with a seat rib 14, upon which the check valve 10 is adapted to seat. A coil spring 15 acts on the check valve 8 and urges the check valve into engagement with the seat rib 7.

The spring 15 is interposed between the check valve 8 and a cover plate 16, and after the spring and the check valve are assembled in the cage 3, the cover plate 16 is applied to the cage and secured thereto by screws 17.

The cover plate 16 is secured to the casing 1 by bolts 18, a gasket 19 being interposed between the cover plate and the casing. The cover plate 16 is provided with an annular flange 20, which fits in a corresponding recess provided in the cover plate 16 and the flange 20 engages the gasket 19 when the parts are secured together, to prevent leakage of fluid. A depending cylindrical portion 21 of the cover plate 16 acts as a stop to limit the upward movement of the check valve 8.

The chamber 5 opens to a passage 22 which communicates with a cavity 23 in the cover plate 16, which cavity in turn communicates with a passage 24 provided in the casing 1, a gasket 25 being provided to prevent leakage of fluid from the passage 22.

In the illustrated embodiment of my invention, the passage 24 is connected to the annular chamber 26 surrounding an air strainer 27 mounted in a casing 28, the chamber 26 being connected to the brake pipe 29 of a fluid pressure brake system. An axial passage 30 of the strainer 27 is connected to a pipe 31 which leads to a brake controlling valve device (not shown). The pipe 31 is connected by passage 32 to chamber 2 of the check valve device.

When fluid under pressure is supplied to the brake pipe 29, the fluid normally passes through the air strainer 27 to the passage 30 and pipe 31, so that the fluid is freed of foreign matter before it reaches the pipe 31 leading to the brake controlling valve device.

Fluid at brake pipe pressure also flows through passage 24, cavity 23 and passage 22 to chamber 5 and acts on the seated area of the check valve 8.

The opposite face of the check valve 8 is subjected to the pressure of fluid in the pipe 31, since chamber 2, which communicates with pipe 31, through passage 32, is open to chamber 4 by way of passages 33 in the cage 3.

If the strainer 27 should become clogged with dirt, so as to retard the flow of fluid therethrough, such that the fluid presure from the brake pipe acting on the seated area of the check valve 8 exceeds the pressure in chamber 4 sufficiently to overcome the pressure of spring 15, the check valve 8 will unseat and thus permit the flow of fluid from the brake pipe to the pipe 31 around the air strainer 27.

In a similar manner, when the brake pipe pressure is reduced, if the pressure of fluid in pipe 31 and acting on the lower seated area of the check valve 10 should exceed the brake pipe pressure acting on the upper face of the check valve, sufficiently to overcome the pressure of spring 11, the check valve 10 will be unseated, permitting the flow of fluid from pipe 31 direct to the brake pipe, without passing through the strainer 27.

If it should become necessary to replace a worn check valve or a broken spring or the like, the check valve construction may be renewed as a unit with the cover plate 16, by withdrawing the bolts 18.

After removal, the check valve 10 may be inspected, and may be removed by unscrewing the screw plug 12. The check valve 8 may be inspected by removing the cover plate 16 from the cage 3, by unscrewing the screws 17.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

The combination with a casing having a recess chamber, of a check valve device comprising a cover plate removably secured to said casing, a cage removably secured to said plate, and extending into said chamber, a pair of check valves mounted in said cage, a plug removably secured to said cage for retaining one of the check valves in the cage, the other check valve being retained in the cage by said cover plate.

ELLIS E. HEWITT.